March 19, 1957
J. B. DYER ET AL
2,785,430
WINDSHIELD CLEANING APPARATUS
Filed Dec. 23, 1954
2 Sheets-Sheet 1
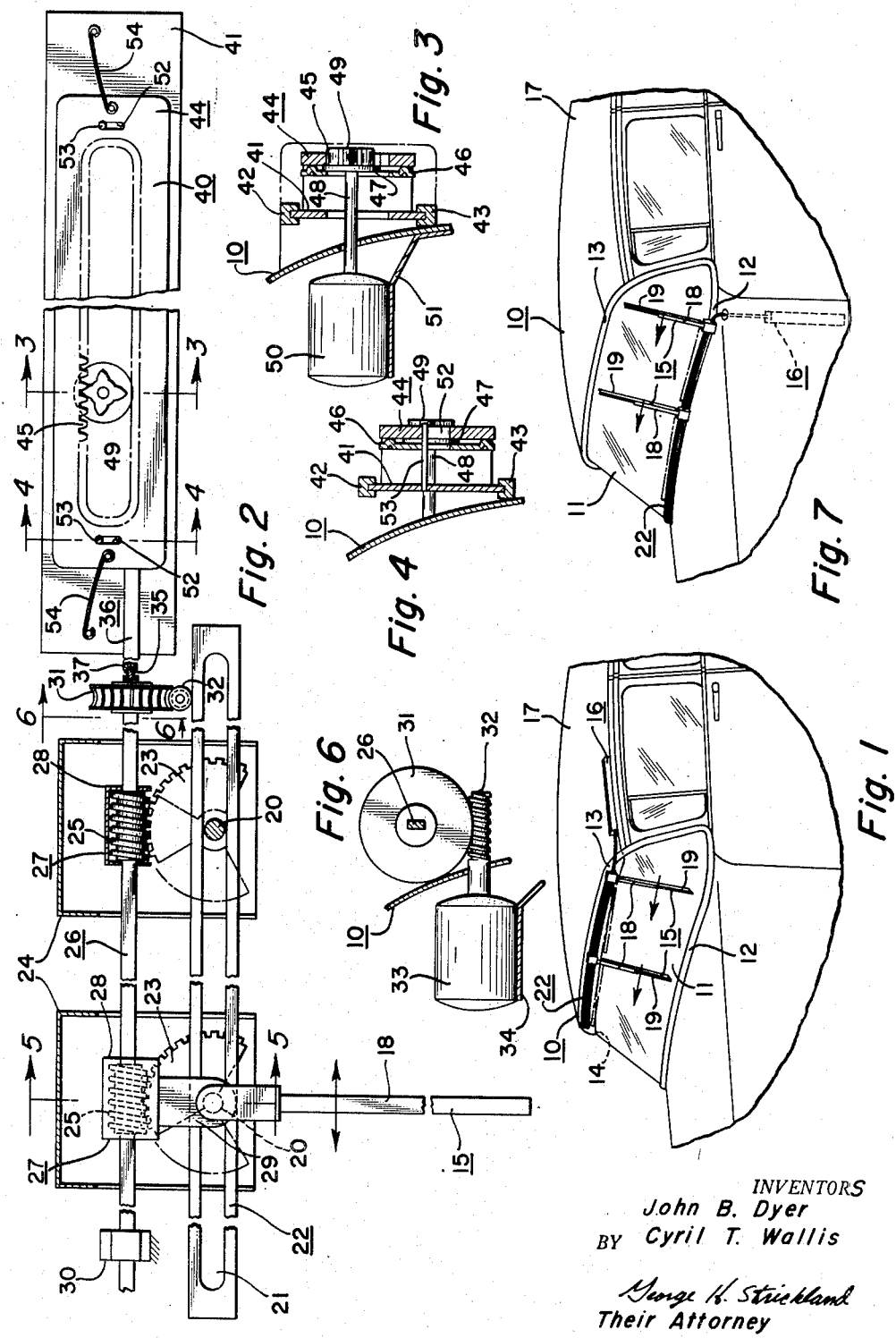
INVENTORS
John B. Dyer
Cyril T. Wallis
BY
George H. Strickland
Their Attorney March 19, 1957 J. B. DYER ET AL 2,785,430
WINDSHIELD CLEANING APPARATUS
Filed Dec. 23, 1954 2 Sheets-Sheet 2

INVENTORS
John B. Dyer
BY Cyril T. Wallis

George H. Strickland
Their Attorney

United States Patent Office 2,785,430
Patented Mar. 19, 1957

2,785,430

WINDSHIELD CLEANING APPARATUS

John B. Dyer, Syracuse, and Cyril T. Wallis, Brockport, N. Y., assignors to General Motors Corporation, Detroit, Mich., a corporation of Delaware Application December 23, 1954, Serial No. 477,168

15 Claims. (Cl. 15—253)

This invention pertains to the art of windshield cleaning, and particularly to actuating mechanism for cleaners that traverse curved vehicular transparencies.

With the advent of compound curved vehicular transparencies, commonly known as wrap around windshields, the problems encountered in designing apparatus for effectively cleaning these surfaces have increased in complexity. Moreover, the inadequacy of present day wiping apparatus has become apparent to almost everyone. The present invention contemplates an arrangement wherein the paths traversed by the blades during their wiping strokes requires only slight flexing of the blades. That is, the path of the blades is such that the blades are substantially parallel to the major axis of revolution, or curvature, of the compound curved surface. Accordingly, among our objects are the provision of windshield wiping apparatus particularly designed for cleaning curved vehicular transparencies; the further provision of actuating mechanism for vehicle windshield wipers including means for imparting movement to the blades for cleaning a surface and independent means for moving the blades to a parked position; and the still further provision of control means for actuating mechanism of the aforesaid character.

The aforementioned and other objects are accomplished in the present invention by the provision of means for oscillating a blade, or blades, from a parked position to an operating position, and independent means for imparting reciprocating movement to the blades when they have been moved to their operating position. Specifically, the wiping apparatus of this invention is particularly adapted for use with vehicles having wrap around windshields wherein the side portions thereof are disposed in substantially parallel, vertical planes on opposite sides of the vehicle, and the transparency subtends an arcuate distance of substantially 180°. The wiper blades are maintained in a substantially vertical position throughout their wiping strokes whereby the blades are only required to flex a relatively small amount to properly conform to the surface to be wiped.

When parked, the blades assume a substantially horizontal position, which may be either against the cowl of the vehicle or against the windshield header. The cleaners are operatively connected to rock shafts, which carry sector worm gears. The sector worm gears engage irreversible worms, the worms being attached to a shaft capable of reciprocation, as well as rotation. Thus, the shaft is generally rectangular in cross section, and slidably receives a worm gear that is drivingly connected with a reversible electric motor. The reversible electric motor is employed to impat rotation to the shaft so as to move the cleaners angularly from a horizontal position to a vertical position, and vice versa.

When the cleaners have been oscillated to the vertical position, the shaft has imparted thereto reciprocation of a predetermined stroke so as to move the cleaners across the transparency. The rock shafts extend through a guide having a longitudinally extending slot therein. In addition, a retainer operatively interconnects the rock shafts and the worm so as to preclude rotation of the rock shafts during reciprocation of the actuating rod.

The actuating shaft, or rod, is connected through a ball and socket joint to one end of a flexible shaft. The other end of the flexible shaft is connected to a reciprocable rack assembly. The rack assembly includes a backing member that is guided for reciprocation by a pair of spaced channeled tracks, an internal rack member which is connected to the backing member by a pair of toggle springs, and a retainer. The rack and retainer are rigidly connected together, and arranged for transverse movement relative to the backing member as permitted by a pair of pins carried by the backing member and extending through elongated openings in the retainer and rack. The rack is drivingly engaged by a pinion gear which is connected to the armature shaft of a unidirectional electric motor. Upon rotation of the pinion gear, reciprocation of a fixed amplitude will be imparted to the rack assembly and wiper blades. The illustrated embodiment of the mechanism for imparting reciprocation to the actuating shaft is only by way of example, as is readily apparent that a suitable crank mechanism could also be employed.

The present invention also includes control means for the actuating mechanism wherein by manipulation of a single manual switch, the apparatus will be conditioned for either running or parking. Thus, the parking motor controls automatic switches for initiating operation of the running motor after movement of the blades to their operating position. Similarly, the running motor actuates automatic switches for controlling the parking motor when the manual operable switch is moved from the running position to the parking position.

Further objects and advantages of the present invention will be apparent from the following description, reference being had to the accompanying drawings wherein a preferred embodiment of the present invention is clearly shown, and wherein similar reference characters denote similar parts throughout the several views.

In the drawings:

Figure 1 is a fragmentary view, in elevation, of a vehicle equipped with wiping apparatus constructed according to this invention.

Figure 2 is a fragmentary view, partly in section and partly in elevation, illustrating the actuating mechanism.

Figures 5, 8:
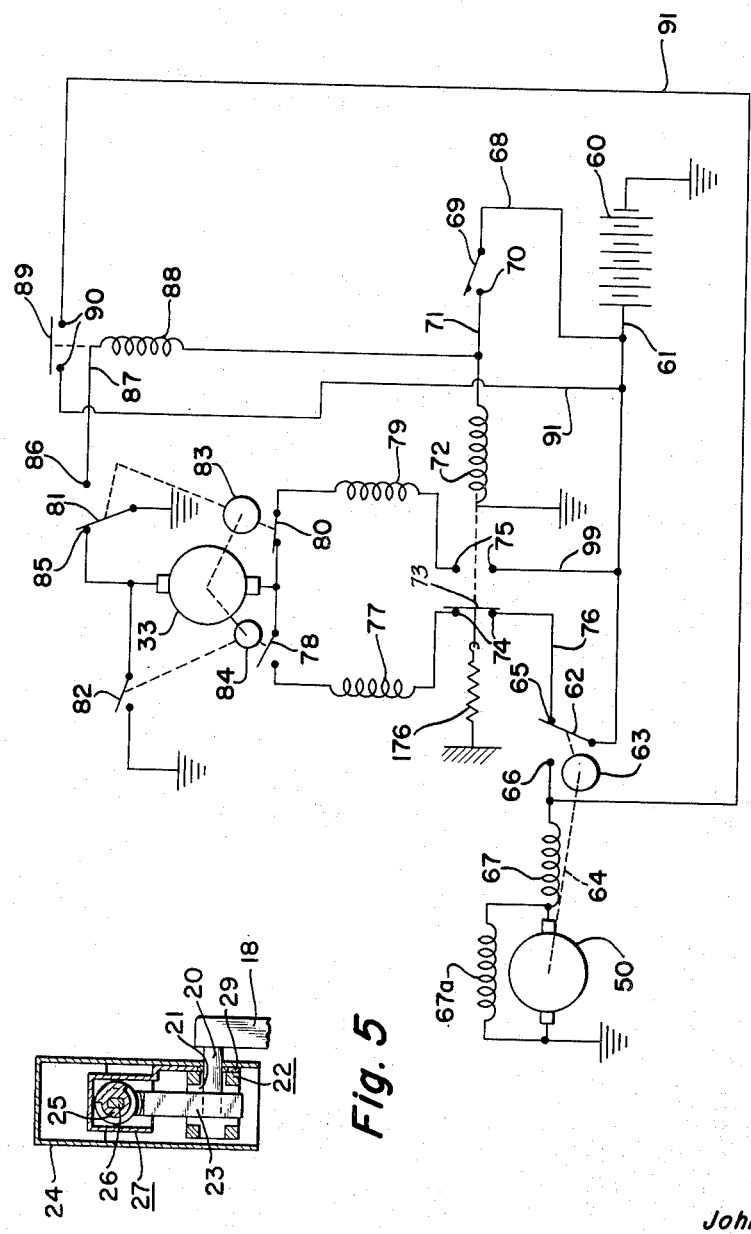

Figures 3, 4, 5 and 6 are sectional views taken along lines 3—3, 4—4, 5—5 and 6—6 of Figure 2.

Figure 7 is a fragmentary view, in elevation, of a modified installation of the wiping apparatus of this invention on a vehicle.

Figure 8 is an electrical circuit diagram for controlling the actuating mechanism of this invention.

With particular reference to Figure 1, a vehicle 10 is depicted having a wrap around windshield 11. The vehicle includes a cowl portion 12 disposed along the lower portion of the windshield 11 and a header portion 13 located adjacent the upper portion of the windshield. The vehicle 10 may also include a horizontally extending shield 14, which is indicated by phantom lines in Figure 1. In this type of vehicle, the cleaners 15 are arranged to be parked adjacent the header 13 in a substantially horizontal position beneath the shield 14. The operating position of the cleaners 15 is substantially vertical, as depicted in Figure 1. The means for imparting reciprocation to the cleaners 15 is generally depicted by the numeral 16 and, as shown, is disposed in the roof 17 of the vehicle.

With reference to Figure 7, a wiper installation is shown on a vehicle 10 wherein the cleaners 15 are parked adjacent the cowl portion 12. In this instance, the actuating mechanism 16 may be located on the engine side of the firewall, not shown, in the vehicle. In both embodiments, the cleaners 15 are maintained in a substantially vertical position during their wiping strokes. Furthermore, it is to be understood that the cleaners 15 may be of conventional design and, thus, include wiper arms 18 and flexible wiper blades 19, which are detachably connected to the arms.

With particular reference to Figures 2 through 7, the means for imparting movement to the cleaners 15 will be described in detail. Each wiper arm 18 is operatively connected with a rock shaft 20. As seen in Figure 5, the rock shafts 20 extend through a slot 21 in a guide member 22, the guide member 22 being rigidly attached to the vehicle 10. Each rock shaft 20 is also connected to a sector worm gear 23, the guide 22 and the sector gear 23 being enclosed in a casing 24, which rotatably supports the shafts 20. The sector gears 23 drivingly engage irreversible worms 25, the worms 25 being fixedly attached to an actuating shaft, or rod, 26, which is substantially rectangular in cross section, as seen in Figures 5 and 6. The shafts 20 and the worms 25 are also operatively interconnected by a retainer 27. The retainer 27 includes a box-like section 28, the end walls of which snugly receive the worm 25. In addition, the retainer 27 includes a depending leg portion 29 through which the shaft 20 extends. The function of the retainer 27 is to prevent angular movement of the sector gear 23 relative to the worm 25 during reciprocation of the rod 26. The rod 26 may be rotatably supported by a vehicle carried bearing sleeve 30, the bearing sleeve 30 also permitting reciprocation of the rod.

As seen in Figures 2 and 6, the rectangular shaft, or rod, 26 carries a worm gear 31, which meshes with a worm 32 formed on the armature shaft of a reversible electric motor 33. By virtue of the rectangular shaft 26, the shaft 26 is free to reciprocate relative to the worm gear 31. However, rotation of the worm gear 31, as effected by the electric motor 33, will impart angular movement to the shaft 26, the purpose of which will be pointed out more particularly hereinafter. The motor 33 is suitably supported by a bracket 34 within the vehicle, and, thus, is maintained in a fixed relation with respect thereto.

The end of the actuating rod, or shaft, 26 is formed with a spherical portion 35, which is received in a complementary socket 37 formed on the end of a flexible shaft 36. The ball and socket connection between the flexible shaft 36 and the rigid shaft 26 permits universal movement therebetween. The other end of the flexible shaft 36 is connected to a reciprocable rack assembly 40. As shown in Figures 2 through 4, the rack assembly 40 includes a backing member 41, which is guided for reciprocable movement by a pair of channeled track members 42 and 43, which are suitably attached to the vehicle 10. The rack assembly also includes a member 44 having an internal rack 45. The member 44 is rigidly connected to a retainer 46, which carries a bushing 47 for rotatably supporting a shaft 48. The free end of the shaft 48 carries a pinion gear 49, which drivingly engages the internal rack 45. The shaft 48 constitutes the armature shaft of a unidirectional electric motor 50, which is supported by a bracket 51 within the vehicle 10. The member 44 is also formed with a pair of elongated slots 52 into which pins 53, carried by the backing member 41, extend. The slots 52 and the pins 53 serve as stops limiting vertical movement of the members 44 and 46 relative to the backing member 41. In order to maintain the pinion gear 49 in engagement with the rack 45, the members 44 and 41 are interconnected by a pair of toggle springs 54.

Operation of the actuating mechanism thus far described is as follows. Upon rotation of the pinion gear 49 by the electric motor 50, reciprocation will be imparted to the internal rack member 44. Inasmuch as this internal rack member is connected to the shaft 36, which is, in turn, connected to the actuating shaft 26, reciprocation of the rack member 44 will impart reciprocation to the shaft 26. Thus, the worms 25 will be reciprocated, and by virtue of the retainers 27, angular movement of the sector gears 23 relative to the worms 25 will be prevented. Thus, the cleaners 15 will be reciprocated in a vertical position throughout their wiping strokes across the vehicular transparency. When the motor 50 is deenergized and the motor 33 is energized for rotation in one direction, rotation of the shaft 26 and the worms 25 will effect angular movement of the cleaners 15 from a vertical position to a horizontal position, in which the cleaners will be parked. Conversely, when the motor 33 is energized for rotation in the opposite direction, the cleaners will be oscillated from a horizontal position to a vertical position, which is the operating position of the cleaners.

With particular reference to Fig. 8, the electrical circuit for controlling operation of the motors 33 and 50 so as to cause sequential energization thereof upon manipulation of a single manual control member, will be described. The electrical circuit includes a battery 60, one terminal of which is connected to ground and the other terminal of which is connected to a conductor 61. The conductor 61 is connected with a movable switch blade 62. The movable switch blade 62 is positioned by a cam 63, which is cyclically actuated by the reciprocating rack assembly 40. Thus, the cam is shown schematically connected by a linkage 64 to the armature of motor 50. The switch blade 62 is arranged to engage either contact 65 or contact 66. The switch blade 62 normally engages contact 66, and is only moved into engagement with contact 65 when the rack assembly 40 reaches the limit position of its movement wherein the cleaners 15 are in the positions indicated in Figs. 1 and 7. The motor 50 may be of the cumulative compound wound type and, thus, includes a series field winding 67 and a shunt field winding 67a.

The conductor 61 is also connected to a branch conductor 68, which includes a manually operable switch blade 69. The manually operable switch blade 69 may be moved into engagement with a contact 70, which is connected to a conductor 71. The conductor 71 is connected through a relay coil 72 to ground. The relay coil 72 has associated therewith a bridging member 73, which is movable between pairs of contacts 74 and pairs of contacts 75. When the coil 72 is deenergized, the member 73 is maintained in engagement with contact 74 by means of a spring 176. However, upon energization of the relay coil 72, the bridging member 73 will be moved into engagement with the switch contact 75.

Contacts 74 are disposed in a conductive path including a conductor 76, one of the series field windings 77 of the reversible electric motor 33 and a cam actuated switch 78. The conductor 76 is connected to the switch contact 65. The motor 33 is of the split series field reversible type and, thus, includes a second series field winding 79, which is connected to the armature through a cam operated switch 80 and, thence, through the contact 75 to a conductor 99, which connects with a conductor 61. It will be understood that when the field winding 77 is energized, the motor 33 will rotate in one direction, and when the field winding 79 is energized, the motor 33 will rotate in the opposite direction. Thus, the armature of the motor 33 may be connected to ground through two separate paths, one of which includes a cam operated switch 81 and the other of which includes a cam operated switch 82. The switches 78 and 82 are controlled by a cam 84, which is positioned by the gear 31. The switches 80 and 81 are controlled by a cam 83, which is, likewise, positioned by the gear 31. The arrangement of the cams 83 and 84, as driven by the gear 31, is such that switches 80 and 81 assume the positions depicted in Figure 8 when the cleaners 15 have been moved to their parked, or horizontal position. At this time, switches 78 and 82 are open. The switch blade 81 is movable between contacts 85 and 86. Contact 86 is connected to conductor 87, which includes a relay coil 88, and is thereafter connected to the conductor 71. When the relay coil 88 is energized, a bridging member 89 connects a pair of contacts 90 in a conductor 91, opposite terminals of which are connected to the conductor 61 and the field windings and armature of the motor 50. Switches 82 and 78 are moved to the closed circuit position when the cleaners 15 have been moved to the vertical position. Moreover, movement of the cleaners 15 to the vertical position, results in the opening of switch 80 and the movement of switch blade 81 from contact 85 to contact 86.

The control system operates in the following manner. With the cleaners 15 in the parked position, switch blade 81 will be in engagement with contact 85, switch 80 will be closed, switches 78 and 82 will be opened, and switch blade 62 will be in engagement with contact 65. As long as the switch blade 69 does not engage contact 70, both of the motors 33 and 50 will be deenergized. To initiate wiper operation, the operator moves contact blade 69 into engagement with contact 70. This movement will energize relay 72, thereby moving the bridging member 73 into engagement with contacts 75. In this manner, a circuit is completed through winding 79 of the split series electric motor 33, which will impart angular movement to the shaft 26 so as to oscillate the cleaners 15 from the horizontal position to the vertical position. When the cleaners 15 reach the vertical position, switch 80 will be opened thereby deenergizing the motor 33, switches 78 and 82 will be closed thereby conditioning the motor 33 for rotation in the opposite direction, and switch blade 81 will have been moved into engagement with contact 86. Thus, the relay coil 88 will be energized, thereby moving the bridging member 89 into engagement with contacts 90. In this manner, a circuit will be completed to an electric motor 50, the cycling switch 62 being shunted. Accordingly, the motor 50 will rotate the pinion gear 49 so as to impart reciprocation to the rack assembly 40, which will, in turn, impart reciprocation to the shaft 26 and the cleaners 15.

When it is desired to interrupt wiper operation, the operator need only move the switch blade 69 out of engagement with the contact 70. This will deenergize the relay coil 72, thereby enabling the spring 176 to move the bridging member 73 into engagement with contacts 74. However, the motor 33 will not be energized until the motor 50 positions the cleaners 15 at the proper end of their wiping stroke, at which position, the cam actuated switch blade 62 will be moved out of engagement with contact 66 and into engagement with contact 65. While the opening of switch 69 deenergizes the relay coil 88, the motor 50 will continue to be energized through the cycling switch 62 until the end position of the cleaner stroke is reached. As soon as the switch blade 62 engages the switch contact 65, a circuit will be completed through the field winding 77 and close switches 78 and 82 to the motor 33 so that the motor 33 will impart rotation to the worm 32 and, thence, to the shaft 26 through the gear 31 so as to move the cleaners 15 to the vertical position or horizontal, or parked position. As soon as the cleaners 15 reach the parked position, the switches 78 and 82 will be opened by the cam 84, thereby deenergizing the motor 33. Simultaneously with opening of switches 78 and 82, the cam 83 will close switch 80 and move the switch blade 81 out of engagement with contact 86 and into engagement with contact 85, thereby conditioning the motor 33 for rotation in the opposite direction upon movement of switch blade 69 into engagement with the contact 70.

From the foregoing, it is apparent that the present invention provides wiping apparatus which will effectively clean compound curved surfaces inasmuch as the cleaners are always positioned substantially parallel to the major axis of curvature of the transparency during their wiping strokes. Furthermore, when the cleaning mechanism is not in operation, the mechanism of this invention will position the cleaners in a horizontal position out of the line of vision of the driver.

While the embodiment of the present invention as herein disclosed, constitutes a preferred form, it is to be understood that other forms might be adopted.

What is claimed is as follows:

1. Windshield wiper apparatus including, a windshield cleaner, first power means for effecting wiping movement of said cleaner, second power means for effecting movement of said cleaner between a parked position and a wiping position, and control means for both of said power means, said first power means automatically conditioning said second power means for operation when said cleaner is moved to a predetermined position.

2. Windshield wiper apparatus including, a cleaner, first power means operable to move said cleaner between parking and operating positions, second power means operable to move said cleaner throughout a wiping stroke, manual means for controlling operation of both power means, and means controlled by said first power means for automatically effecting operation of said second power means after said cleaner has been moved from the parked position to the operating position by said first power means.

3. Windshield wiper apparatus including, a cleaner, a reversible electric motor operatively connected to said cleaner for effecting movement thereof between a parked position and an operating position, a second electric motor opratively connected to said cleaner for effecting wiping movement of said cleaner when it is in said operating position, and manually operable means connected with said electric motors for controlling the operation thereof.

4. Windshield wiper apparatus including, a cleaner, a first electric motor operatively connected to said cleaner for effecting movement thereof between a parked position and an operating position, a second electric motor for effecting wiping movement of said cleaner when it is in said operating position, manually operable means for controlling energization of said motors, and means controlled by said first electric motor for energizing said second electric motor upon movement of said cleaner from the parked position to the operating position by said first electric motor.

5. Windshield wiper apparatus including, a cleaner, a first electric motor operatively connected to said cleaner for effecting movement thereof between a parked position and an operating position, a second electric motor operatively connected to said cleaner for effecting wiping movement thereof when it is in said operating position, manually operable means for controlling energization of said electric motors, and means actuated by said second motor for conditioning said first motor when said cleaner has been moved to a predetermined position by said second motor.

6. In combination with a vehicle having a windshield, a cleaner for said windshield, first means for moving said cleaner between horizontal and vertical positions, and second means for imparting reciprocation to said cleaner when it is in the vertical position.

7. In combination with a vehicle having a windshield, a horizontal guide member carried by said vehicle and located adjacent an edge of said windshield, a cleaner for said windshield including a shaft, said guide member having a slot therein, said shaft extending through said slot, means connected with said shaft for imparting angular movement thereto so as to move said cleaner between a horizontal position and a vertical position, and means connected to said shaft for imparting reciprocation to said shaft and cleaner when said cleaner is in the vertical position.

8. The combination set forth in claim 7 wherein said guide member is located adjacent the upper edge of said windshield.

9. The combination set forth in claim 7 wherein said guide member is located adjacent the lower edge of said windshield.

10. In combination with a vehicle having a windshield, a guide member attached to said vehicle adjacent an edge of said windshield, said guide member having a horizontal slot therein, a cleaner for said windshield including a rock shaft which extends through the slot in said guide member, a gear attached to said shaft, means for imparting rotation to said gear so as to move said cleaner between horizontal and vertical positions, and means for imparting reciprocation to said cleaner through said rock shaft when said cleaner is in the vertical position.

11. The combination set forth in claim 10 wherein said gear drivingly engages a worm, and wherein the means for effecting rotary movement of said gear includes a shaft connected to said worm.

12. In combination with a vehicle having a windshield, a guide member attached to said vehicle adjacent an edge of said windshield, said guide member having a horizontal slot therein, a cleaner for said windshield including a rock shaft which extends through a slot in said guide member, a gear attached to said shaft, a worm drivingly engaged by said gear, means for imparting rotation to said gear including said worm and a shaft connected to said worm to move said cleaner between horizontal and vertical positions, and means for imparting reciprocation to said cleaner through said rock shaft when the cleaner is in the vertical position, said last recited means including a retainer operatively interconnecting said worm and said rock shaft so as to prevent rotation of said gear upon reciprocation of said worm.

13. In combination with a vehicle having a windshield, a guide member attached to said vehicle adjacent an edge of said windshield and having a horizontal slot, a cleaner for said windshield including a rock shaft which extends through the slot in said guide member and has attached thereto a gear, an actuating shaft rotatably journaled in said vehicle and arranged for reciprocable movement relative thereto, a worm attached to said actuating shaft and drivingly engaging said gear, means rotatably connected with said actuating shaft but permitting reciprocation of said shaft relative thereto for imparting rotation to said shaft so as to effect movement of said cleaner between horizontal and vertical positions, and means operatively connected with said actuating shaft for imparting reciprocation thereto when said cleaner is in the vertical position.

14. The combination set forth in claim 13 wherein said actuating shaft is rectangular in cross section, and wherein said first recited means comprises a gear which is slidably received by said actuating shaft.

15. The combination set forth in claim 13 wherein the interconnection between said actuating shaft and said last recited means includes a ball and socket joint.

References Cited in the file of this patent
UNITED STATES PATENTS

| | | |
|---|---|---|
| 1,661,388 | Sather | Mar. 6, 1928 |
| 2,012,804 | Bean | Aug. 27, 1935 |
| 2,031,830 | Hansmann | Feb. 25, 1936 |
| 2,319,408 | Korte | May 18, 1943 |